(12) United States Patent
Brownrigg (10) Patent No.: US 8,630,301 B2
(45) Date of Patent: Jan. 14, 2014

(54) CITIZENS' EMERGENCY NETWORK SYSTEM AND METHOD

(76) Inventor: Edwin B. Brownrigg, Roseville, CA (US)

( * ) Notice: Subject to any disclaimer, the term of this patent is extended or adjusted under 35 U.S.C. 154(b) by 118 days.

(21) Appl. No.: 13/246,015

(22) Filed: Sep. 27, 2011

(65) Prior Publication Data

US 2012/0076134 A1  Mar. 29, 2012

Related U.S. Application Data

(60) Provisional application No. 61/387,213, filed on Sep. 28, 2010.

(51) Int. Cl.
*H04L 12/28* (2006.01)
*H04L 12/56* (2011.01)
*G01S 19/17* (2010.01)

(52) U.S. Cl.
USPC ... 370/401; 370/277; 342/357.55; 379/88.13; 379/93.09; 379/93.26; 379/221.03; 379/221.04

(58) Field of Classification Search
USPC ............. 370/277, 401, 913; 342/357.55; 379/27.01, 27.02, 29.03, 29.04, 32.02, 379/38, 85–88.08, 88.13, 93.09, 93.26, 379/221.03, 221.04, 282–283; 455/518–521
See application file for complete search history.

(56) References Cited

U.S. PATENT DOCUMENTS

| | | | | |
|---|---|---|---|---|
| 6,044,062 A * | 3/2000 | Brownrigg et al. | ............ | 370/238 |
| 6,249,516 B1 * | 6/2001 | Brownrigg et al. | ............ | 370/338 |
| 7,054,271 B2 * | 5/2006 | Brownrigg et al. | ............ | 370/238 |
| 8,000,314 B2 * | 8/2011 | Brownrigg et al. | ............ | 370/351 |
| 2006/0080344 A1 * | 4/2006 | McKibben et al. | ............ | 707/100 |
| 2007/0124144 A1 * | 5/2007 | Johnson | ............ | 704/246 |
| 2007/0127682 A1 * | 6/2007 | Fleming et al. | ............ | 379/221.08 |
| 2012/0076134 A1 * | 3/2012 | Brownrigg | ............ | 370/352 |

OTHER PUBLICATIONS

"VoIP and Amateur Radio"; Ford, Steve; QST ARRL; Feb. 2003.*

* cited by examiner

*Primary Examiner* — Benjamin H Elliott, IV
(74) *Attorney, Agent, or Firm* — David M. Lang; Law Offices of David M. Lang (57) ABSTRACT

A system and method to provide an emergency communication network including a first responder device and at least one recipient by using a local agency communication node configured to relay communications using, in part, a VoIP interface to retransmit a communication received at a local agency as a ham communication received by at least one ham radio communication node which may be sent to and received by one or more recipients though a VoIP interface over the Internet.

15 Claims, 9 Drawing Sheets

CITIZENS' EMERGENCY NETWORK SYSTEM AND METHOD

CROSS-REFERENCE TO RELATED APPLICATIONS

The application claims 35 U.S.C. §119(e), to U.S. Provisional Application 61/387,213 filed Sep. 28, 2010, entitled "CITIZENS' EMERGENCY NETWORK SYSTEMS & METHODS" which is currently pending and incorporated by reference into this application as if fully set forth herein.

FIELD OF THE INVENTION

Embodiments of the present invention relate generally to communications systems and more particularly to wireless and wired communication systems that enable and/or provide emergency network systems for a variety of users and participants.

BACKGROUND

In times of natural disaster, war, emergency, or other catastrophe, wireless telephone and telephone communications may be severely impacted or totally unavailable. Hurricane Katrina damaged or destroyed landline and cellular services to such a degree that Paul McHale, the Assistant Secretary of Defense for Homeland Defense said: " . . . the magnitude of the storm was such that the local communications system wasn't simply degraded; it was, at least for a period of time, destroyed." Landline telecommunications were compromised, as much of the backbone conduit for landline service was flooded as were many of the central switching centers. Cellular towers were damaged by wind or ultimately left powerless leaving users without any means of communication.

Following Hurricane Katrina, ham radio operators directly assisted rescue efforts, even in the hardest hit areas, and were credited with saving stranded flood victims in Louisiana and Mississippi. Because natural and other disasters can degrade or destroy traditional telephone systems and wireless cellular networks, ham radio assets may be the most viable method of communication. Ham radio operators have already proven instrumental in providing assistance during disasters.

There have been efforts to establish a national system for emergency response. For example, the FCC has developed such system intended to assist first responders. The FCC's system is based on a 700 MHz band spectrum, FCC recycled UHF television frequencies with a limited spectrum available to first responders. The FCC's national emergency response system depends on trunked radio: a complex type of computer-controlled radio system that uses few channels (the actual frequencies), and can have apparently unlimited talk groups. Trunked radio operates on the premise that given the probability of any number of user units, not everyone will need channel access at the same time. As a result, fewer discrete radio channels are required.

Trunked radio systems have their drawbacks—particularly when utilized in the setting of a large-scale disaster. First, trunked systems can be easily overwhelmed in disaster situations where high-volume emergency use is required. Second, trunked systems do not permit interoperability between different groups or agencies who may respond to a disaster. These two limitations make the FCC's trunked system less-than-ideal for disasters—where there is high volume traffic and where many users—each with different systems—will have a sudden need to communicate with each other. High-profile failures of trunked systems have been described, including the unfortunate abduction and murder of Polly Klass. The California Highway Patrol issued an all points bulletin for the perpetrator; however, that bulletin was not received by officers operating on a different frequency, who were unaware of the bulletin, and released the perpetrator after a routine traffic stop. In that case, the trunked system failed to provide interoperability between departments. Had a system been in place which allowed the all points bulletin to be received by all points—the result may have been different. Other examples of trunked system limitations include Mothers' Day and Christmas where high call volume increases the probability that a call will fail as the result of inadequate trunked long distance capacity. As the result of a busy network, some phone calls are not completed as trunked systems are overwhelmed.

Moreover, the FCC's system requires power-grid electricity, which may, quite predictably, be absent during a large scale national disaster or emergency. Additionally, the FCC's system provides no Internet connectivity, no Public Switched Telephone Network (PSTN) Remote Authentication Dial In User Service (RADIUS) gateway access, no long-distance interoperability, and is grossly expensive compared to a system utilizing, in part, a volunteer-based ham radio system.

Therefore, what is needed is a Citizens' Emergency Network that fosters interoperability between agencies and may be utilized to facilitate communication between first responders such as police and fire and medical assets on the ground. What is further needed is a system permitting communication between local police and fire command and control systems and other organizations such as the military or National Guard. What is further needed is a system which may be utilized quickly without the need for years of costly infrastructure expenditures to build a system from the ground up. What is further needed is a system to provide communication between first responders on the ground and specific individuals within the Secretary of Homeland Security or the Federal Emergency Management Agency when needed.

SUMMARY

Aspects of the present invention permit network systems that can transmit messages over one or more networks using varying communication protocols. Embodiment network nodes can operate in server mode when powered by grid power and having Internet access or client mode where not powered by grid power and lacking Internet access. Embodiments of the present invention, rather than teaching a one-hop trunked radio circuit, provide emergency communication over potentially unlimited distances to radio networks and individual first responders and one or more recipients addressable by a TCP/IP address. Further, embodiments of the present invention combine Voice over Internet Protocol (VoIP) programs, such as ECHOLINK and IRLP, with a ham network infrastructure to permit a service's local agency to access a Citizens' Emergency Network to provide a survivable and robust communication network that permits interoperability between different organizations and agencies. The previously unforeseen result is a system for interoperable communications between first responders and between first responders and a remote agency in the immediate aftermath of a natural or manmade disaster.

DETAILED DESCRIPTION OF CERTAIN ASPECTS OF THE PREFERRED AND ALTERNATIVE EMBODIMENTS

Figure 1:
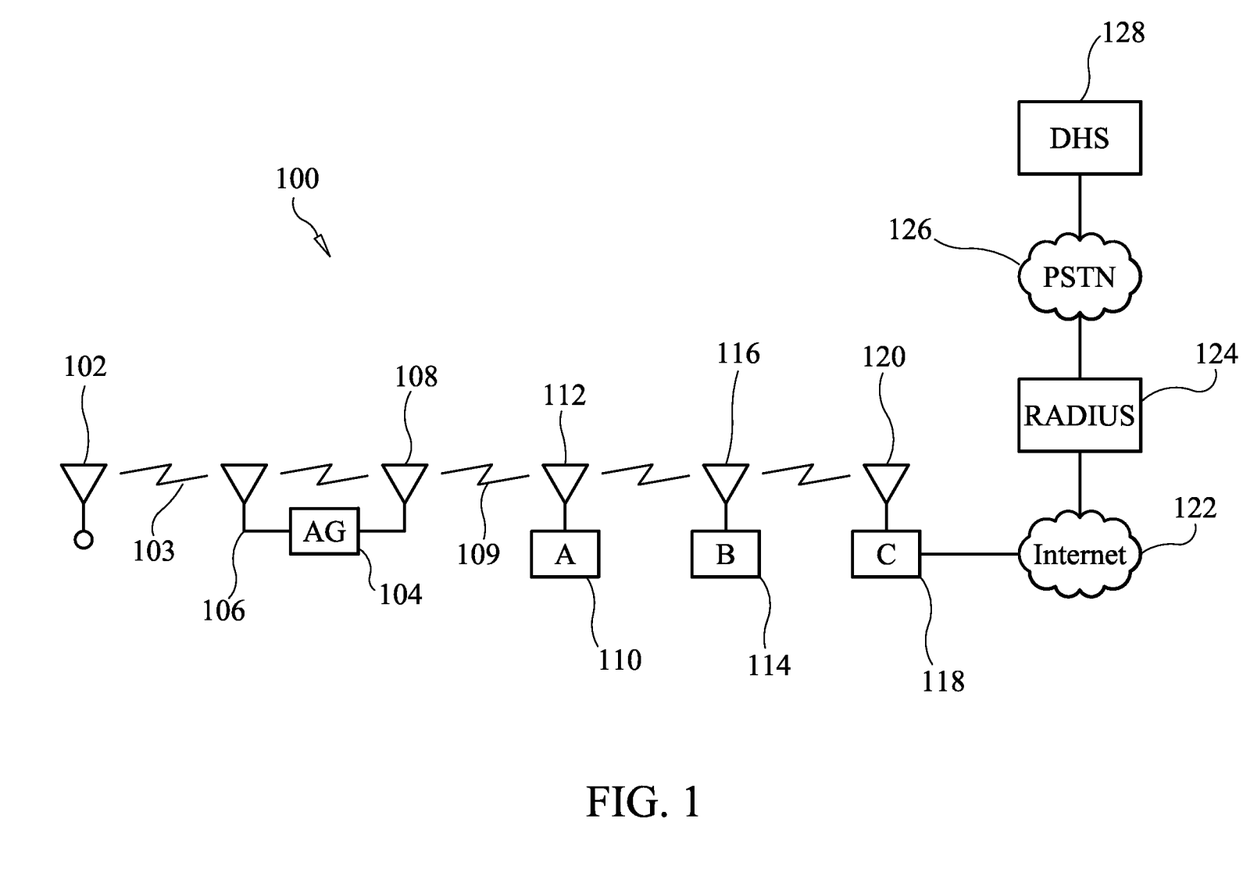
FIG. 1 is an embodiment block representation of a wireless network system.

FIG. 1 illustrates an embodiment Citizens' Emergency Network 100 comprising a first responder communication device, (FR) 102, which may be a hand-held, portable, two-way transceiver—including the common walkie-talkie. Communication gateway, represented as agency gateway (AG) 104 has a first transceiver, adapted to communicate with FR 102, is coupled to antenna 106, and a computer having a VoIP interface, such as ECHOLINK, coupled to the first transceiver, and a second ham transceiver coupled the computer capable of sending communications through antenna 108 as a ham frequency communication 109. Communications received from communication device 102 through antenna 106 are gatewayed at communication gateway 104 to relay communications and messages from communication device 102 to one or more recipients. It should be noted that "first responder" applies to those rendering assistance at the scene of a disaster, and that there can be any number of "first responders" and "first responder devices" as applied to the present invention.

In one example, communication gateway 104 provides connection between a licensed frequency 103 used by a first responder's agency (e.g. fire or police) transmitted by first responder device 102 and a ham frequency used in the Citizens' Emergency Network 100. In one example, communication gateway 104 is configured by using VoIP software, such as ECHOLINK, running at gateway 104 which can take the incoming first responder's transmission 103 and using streaming-audio technology, re-transmit the communication as a ham frequency 109. Frequency 109, can be any number of frequencies, however, one particularly useful frequency is 802.11a protocol at frequency of 2.4 GHz at 200 watts using orthogonal frequency-division multiplexing (OFDM) to provide ample power during a disaster. After communication 103 has been converted from the first responder's agency's frequency 103 to a ham frequency 109 at gateway 104, the communication 109 is destined to reach a server with Internet connectivity, such as node C 118, and ultimately one or more recipients or specifically intended recipients.

FIG. 1 illustrates example local agency node 104 and ham radio communication nodes: A 110, B 114, and C 118 and means by which a first responder can reach Internet connectivity 122. Assume that communication device 102, agency gateway AG 104, node A 110, and node B 114 are all operating on battery or solar power and lack Internet access, and node C 118 is operating on grid power and has Internet access. Further assume that each node is in radio range only with each adjoining node. That is, device 102 is only in communication range with agency gateway AG 104; gateway AG 104 is only in communication range with device 102 and node A 110; node A 110 is only in communication range with gateway 104 and node B 114; node B is only in communication range with node A 110 and node C 118; and node C 118 is only in communication with node B. It should be immediately realized that while several specific nodes are described, any number of nodes can be in the system.

As described more fully below, after powering up, nodes AG 104, A 110, B 114, and C 118 will run a node configuration process to determine if the node will function in server mode or client mode depending on Internet connectivity and power status, and in our example all nodes except node C will run in client mode. First responder device 102 initiates communication 103 which is received by local agency node AG 104. Local agency AG 104's transceiver being coupled to a computer having a VoIP interface (such as ECHOLINK streaming-audio technology) sends communication through local agency AG 104's second transceiver (a ham capable transceiver) through antenna 108 as a ham frequency communication 109.

The next in line node A 110 receives transmission 109 through antenna 112. Because Node A 110 lacks grid power and Internet connectivity, it will operate in client mode, and the communication will be routed to Node B 114. Node B 114 also lacks grid power and Internet connectivity, will operate in client mode, and will route communication 109 to Node C 118. Node C 118 has grid power and Internet connectivity via computer connection to node C 118's transceiver, and thus operates in server mode. Running in server mode Node C 118 running a VoIP program (such as ECHOLINK) is gatewayed to the Internet to provide Internet connection 122, permitting communication 109 to be sent by streaming audio as described more fully below.

Communication 109 is processed at node 118 which configures one or more messages (including example 109) for transmission via the Internet to an intended recipient. In one embodiment, this configuration is achieved by providing streaming audio through Internet connection 122 using ECHOLINK. In one embodiment, the communication may be received by any user connected to the Internet running ECHOLINK. In another embodiment, the communication may be private. For example, a first responder's device 102 may be equipped with a Dual Tone Multiple Frequency keypad (DTMF). A DTMF hand-held transceiver could address any Public Switched Telephone Network (PSTN) 126 phone number, such as that of the Secretary of Homeland Security. Additionally, in one embodiment, secure communications may be provided using a strategically located Remote Authentication Dial-In User Service (RADIUS) 126 server on the Internet. The RADIUS enabled-server 124 is capable of operating in accordance with a networking protocol that provides centralized Authentication, Authorization, and Accounting (AAA) management for computers to connect and use a network service. RADIUS server 124 acts as a gateway between the ECHOLINK TCP/IP network and the Public Switched Telephone Network (PSTN) 126. Thus, as can be seen from FIG. 1, a first responder using a handheld first responder device 102, via the Citizens' Emergency Network 100, can reach Internet connectivity and thus communicate with anyone in the world having access to such connectivity.

Regarding the frequency 109, one particularly useful frequency is 802.11a protocol at frequency of 2.4 GHz at 200 watts using orthogonal frequency-division multiplexing (OFDM). Further, in one embodiment of the present invention, any antenna, such as antennas 106, 108, 116, or 120, could be an omnidirectional antenna.

As described above, the present invention includes a network of communication nodes communicatively networked with a communication gateway, with at least a portion of the communication nodes configured to operate in a first power state when supplied with grid power, and a second power state when supplied with power from a source other than the power grid supply. Thus, the present invention includes a process to determine the presence or absence of grid power, and thus Internet connectivity, and place a node in a first power state or second power state and operate in server mode or client mode respectively.

Figure 2:
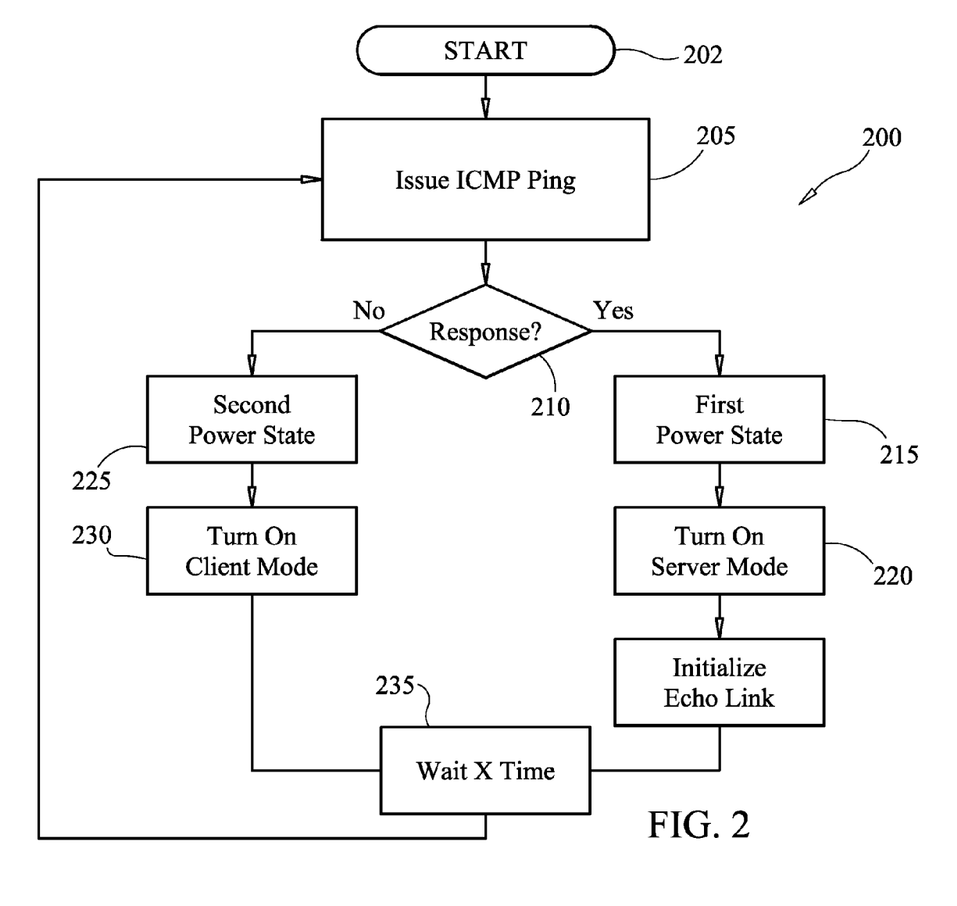
FIG. 2 is a flow diagram of a node determination status process.

There are several different methods to test for power status and Internet connectivity. In one example illustrated by FIG. 2, the process to determine power source by Internet connectivity is described. Process 200 begins at 202, and in step 205 a ping is issued in the form of an Internet Control Message Protocol (ICMP) packet from the input/output method available on the processor where software is running to one or more reliable destination addresses, such as www.yahoo.com or www.google.com as present examples. Next, decision step 210 determines whether a response has been received within a certain predefined timeout period, such as 7-8 milliseconds. If at decision step 210, a response is received within the timeout period, step 215 places the controller in a first power state, and in step 220 server mode is turned on, and the communication node is configured as a server node and VoIP software, such as ECHOLINK is initialized. If at decision step 210 no response has been received within the timeout period, step 210 places the controller in a second power state 225, and in step 230 the client mode is turned on, and communication node is configured as a client node. After the process has placed the controller in server mode 220 or client mode 230, process step 235 waits a specific preselected interval of time, such as ten minutes, and returns to step 205 issuing an ICMP ping to determine Internet connectivity. If the node had been running in a first power state in server node, but has lost grid power, Internet connectivity will be lost, and the node will be reconfigured to the second power state turning on client mode, and reconfiguring the communication node as a client node. If the node had been running in a second power state in client node, but power and Internet connectivity were established/re-established, the communication node would be reconfigured to the first power state turning on server mode, and reconfiguring the communication node as a server node.

The present invention is robust and survivable, as communication between nodes may change if the node is mobile or if it drops out of the network. For example, Dynamic Forward Routing (DFR) is known in the prior art and described in U.S. Pat. No. 6,249,516 (issued Jun. 19, 2001), U.S. Pat. No. 7,054,271 (issued May 30, 2006), and U.S. Pat. No. 8,000,314 (issued Aug. 16, 2011) each incorporated by reference as if more fully set forth herein, provides systems and a method to permit the selection of the best route to a server and for nodes to be dynamically switched without losing connectivity between first responder device 102 and Internet connection 122.

Figure 3:
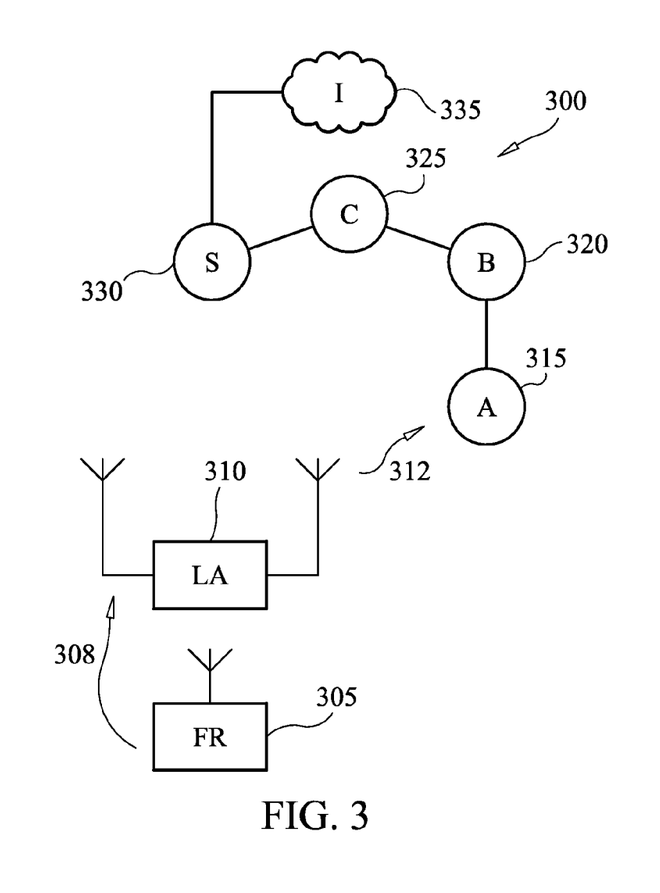
FIG. 3 is a tree structure illustration depicting an embodiment network and communication nodes.

For example, FIG. 3 illustrates an example demonstration of the dynamic capabilities of the Citizens' Emergency Network 300 as it relates to changing node availability. Example network 300 demonstrates a first responder device (FR) 305 sending communication 308 which is received by the first responder's local agency LA 310. Assume Nodes A 315, B 320, C 325, and S 330, are ham radio network nodes, and assume all lack grid power, except Node S 330, which operates as a server node. As described above, LA 310 using VoIP software such as ECHOLINK, is gatewayed to a transceiver which can convert communication 308 to a ham frequency 312 as described above and attempt to forward it to a server. As taught by U.S. Pat. No. 6,044,062, U.S. Pat. No. 6,249,516, U.S. Pat. No. 7,054,271 and U.S. Pat. No. 8,000,314 to Brownrigg et al., on first powering up, LA 310, Node A, Node B, Node C will all attempt to link to server radio S, and only Node C 325 will succeed in discovering a "one hop" route to server radio S 330. As described before, lacking grid power, Node A 315 will operate in client mode and communication 312 will be forwarded to Node B 320. Node B 320 lacks grid power, operates in client mode, and forwards communication 312 to Node C. Node C also lacks grid power, and thus forwards the communication to server S 330 which has grid power, operates in server mode, and has Internet Connection 335. Node A 315 is said to be "three hops" from server Node S; Node C 325 being "one hop" from server S, and Node B 320 being "two hops." As a general rule, it is more desirable to be closer to the server resulting in fewer "hops." While embodiments of the present invention may prioritize the route a server on the basis of distance, other embodiments of the present invention may prioritize the route to the server on the basis of traffic or other factors.

Figure 4:
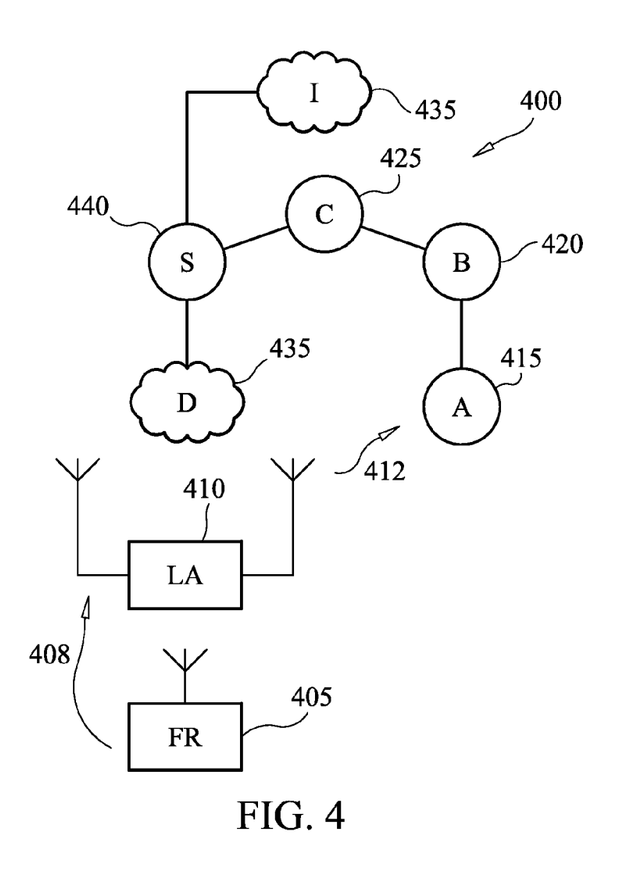
FIG. 4 is a tree structure illustration depicting an embodiment network and communication nodes.

Now, turning to FIG. 4, assuming, after becoming aware of a disaster, a ham radio operator powers his system up at Node D 435 and operates on either battery power or generator power but grid power is unavailable and there is no Internet accesses. Now, a better, "two hop" route from LA 410 to S 440 exists. FR 405 is thus dynamically switched from Node A (which is "three hops" to server Node S) to Node D (which is one hop to server Node S) and the communication path is optimized as taught by U.S. Pat. No. 6,044,062, U.S. Pat. No. 6,249,516, U.S. Pat. No. 7,054,271 and U.S. Pat. No. 8,000,314 to Brownrigg et al. Importantly, the switching will not require any action by the first responder using the first responder device FR 405 and will not result in loss of connectivity between FR 405 and Internet connection 435. In this way, the system may configure communications between a first responder on the ground and ham radio nodes that may enter or exit the network during a disaster.

Figure 5:
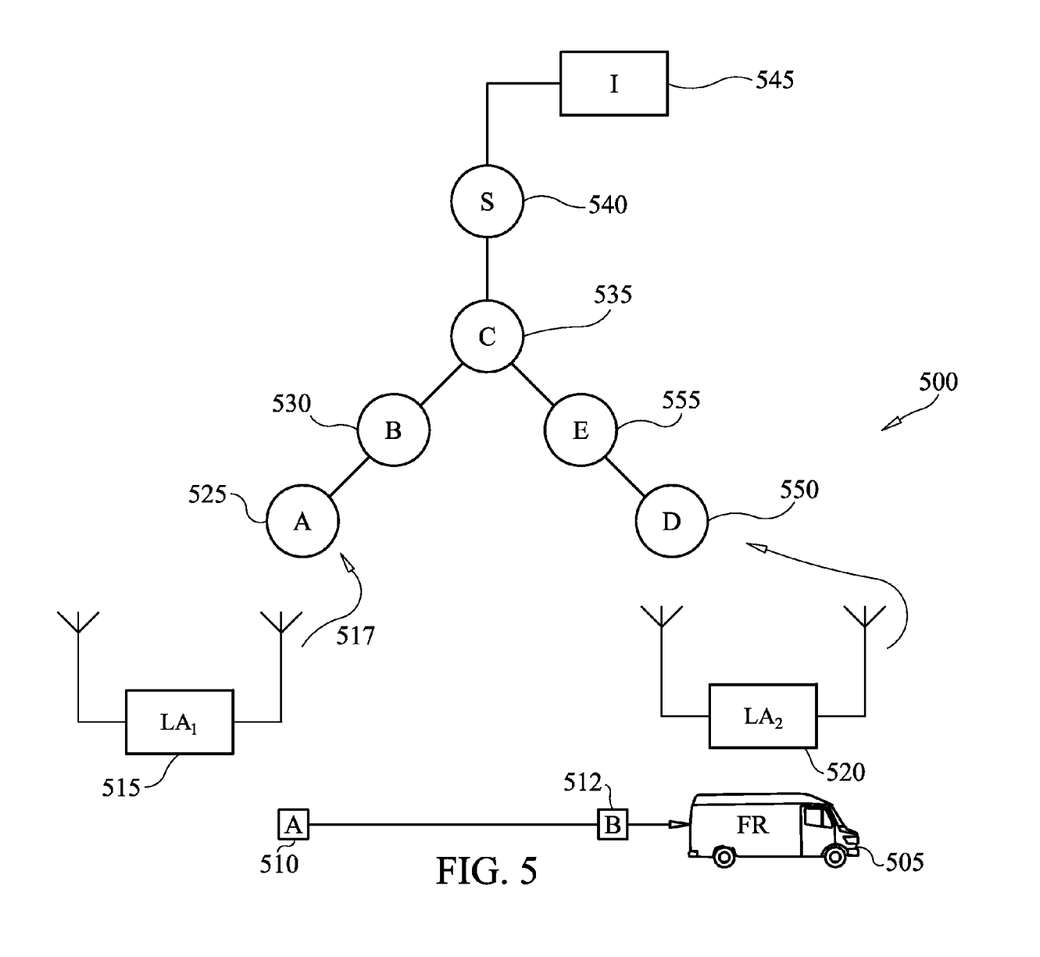
FIG. 5 is a tree structure illustration depicting an embodiment network and communication nodes including a moving first responder device.

During a disaster, first responders are frequently on the move. FIG. 5 illustrates how an example Citizens' Emergency Network 500 responds to mobile first responders. Assume Nodes A 525, B 530, C 535, D 550, and E 555 are ham operators operating with battery or solar power—but without grid power or Internet access. Assume node S 540 is a ham operator operating (perhaps in an adjoining town) with grid power and has Internet connection 545. Now, First Responder FR 505 starts in position A 510, and is in communication with that First Responder's Local Agency LA1 515. As described more fully above, the communication sent by FR 505 may be gatewayed at LA1 515 and using ECHOLINK, transmitted as a ham frequency communication 517 which can be picked up and propagated via the Citizens' Emergency Network 500. As described above, communication is received by Node A 525, transmitted to Node B 530, and thereafter Node C 530—all lacking grid power Internet connectivity, and operating in client mode. Node S has grid power, operates in server mode, and has Internet connection 545. As the First Responder FR 505 leaves position A 510 and moves to position B 512, they leave radio communication with LA1 515 and enter another of the First Responder's Local Agencies LA2 520. LA2 520, having a gateway using ECHOLINK, retransmits the communication as a ham frequency. LA2 520 is in radio contact with ham operator Node D 550, who is in turn in radio contact with Nodes E 555 and C 535, and subsequently server node S 540 with Internet Connection 545. Communication between FR 505 and Server S 540 with Internet Connection 545 will continue unbroken. Thus, using the Citizens' Emergency Network 500, the FR 505 may be placed in radio contact with any agency that directly accesses gateways into the ham network.

Figure 6:
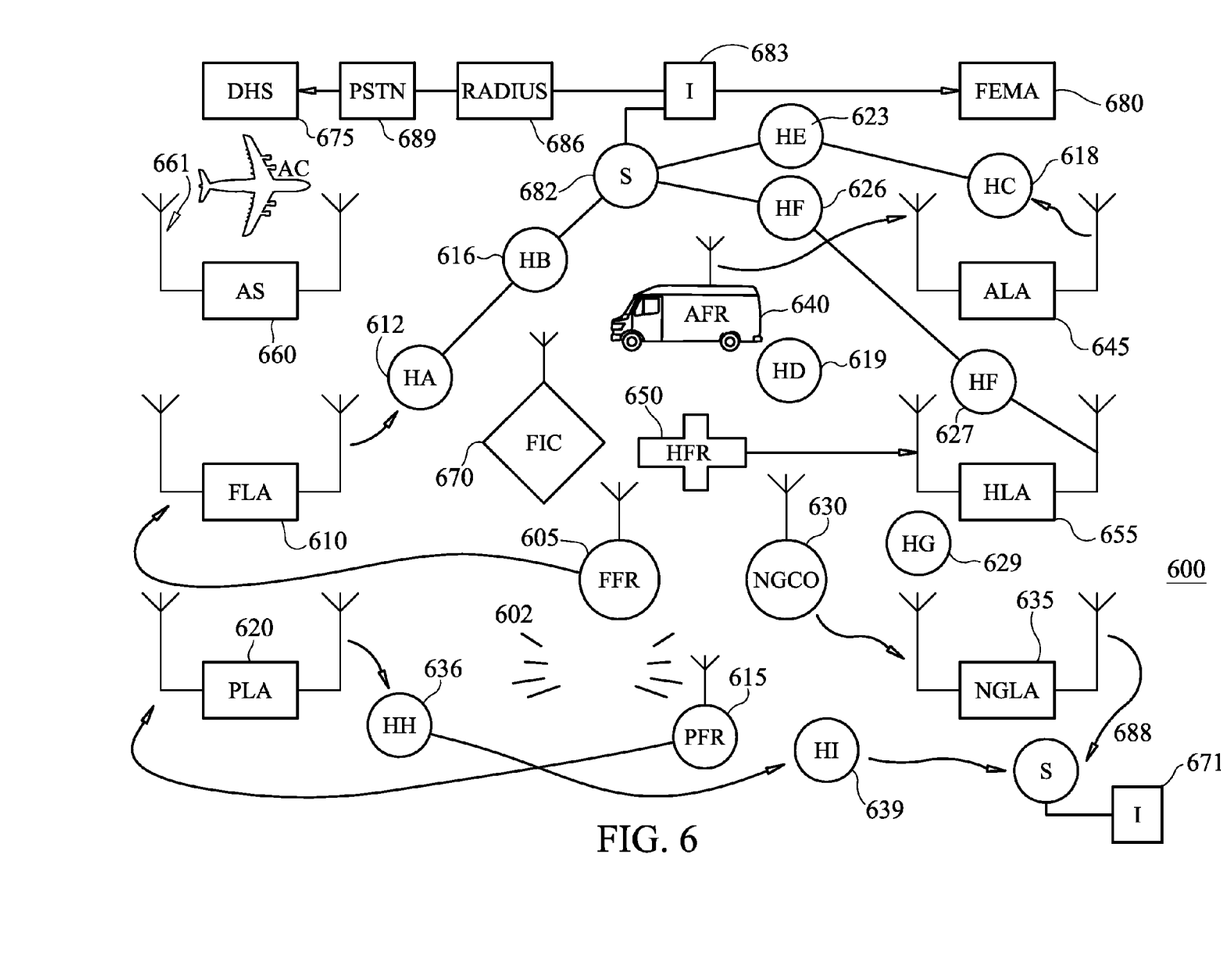
FIG. 6 is a schematic illustrating depicting a multidisciplinary response to a mass casualty event.

FIG. 6 represents a hypothetical city experiencing an attack resulting in a disaster. FIG. 6 illustrates an example Citizens' Emergency Network 600 which may be utilized during such a disaster or mass casualty incident where an interdisciplinary response is typical and where each responding agency has its own communication devices, dispatch centers, and frequencies. For purposes of illustration, we will assume a hypothetical hurricane and flooding. Assume grid power is unavailable for all agencies and nodes except Server Nodes S 682 and S 688. As with Hurricane Katrina, assume cellular service is unavailable. Under existing prior art solutions, each responding entity can communicate with their agency but not directly with each other.

A number of first responders will arrive at ground zero 602 of the incident. For example, Fire First responder FFR 605 arrives and is in contact with Fire Local Agency FLA 610. Police first responder PFR 615 arrives and is in contact with Police Local Agency PLA 620. National Guard assets are deployed, and a National Guard Commanding Officer NGCO 630 has radio contact with a National Guard Local Agency NGLA 635 over military frequencies. Emergency Medical Technicians responding by ambulance arrive as Ambulance First Responders AFR 640 and are in radio contact with Ambulance Local Agency ALA 645. A hospital based physician Hospital First Responder HFR 650 is in radio contact with its base Hospital Local Agency 655. An airstrip AS 660 having an operational runway has the ability to access the Citizens' Emergency Network 600. As can be seen, all agencies are operating on different frequencies. Ham operators HA 612, HB 616, HC 618, HD 619, HE 626, HF 627, HG 629 and HI 639 are operating on ham frequencies and powered on and running with battery or solar power but without grid power or Internet access. Server nodes S 682 and S 688 have grid power and Internet connectivity.

Fire First responder FFR 605 is first to arrive and relays information regarding the size, scope, and nature of the incident to Fire Local Agency FLA 610. Realizing a large number of casualties, FFR 605, seeks to mobilize civilian ground ambulance assets. FFR 605 communicates with Fire Local Agency 610, which is in turn gatewayed and converted to a ham frequency, then transmitted to ham node HA 612. The transmission is received by ham node B HB 616 and the transmission is sent to server 682 which is gatewayed to Internet Connection 683. Ambulance Local Agency ALA 645 is in radio contact with ham node HC 618, which has contact with ham node HE 623, which is in radio contact with server S 682. ALA 645 therefore accessing Citizens Emergency Network 600 and can receive a request from FFR 605, and can transmit a response which can be received by FFR 605. FFR 605 and ALA 645 are in communication via node S 682. Ambulance Local Agency ALA 645 can dispatch ambulance first responder AFR 640 via its customary local radio frequency.

Fire First responder FFR 605 recognizing only one accessible road to the scene, wants to avoid a glut of ambulances blocking the only accessible road, and therefore seeks to set up an ambulance staging area for all responding ambulances. Thus it is advantageous for FFR 605 to communicate with responding Ambulance First Responder AFR 640. FFR 605, is in communication with server S 682 as described above and transmits a communication for AFR 640. The communication is received at server 682 and "hops" through nodes HE 623 and HC 618 to ALA 645 where it is gatewayed back through to Ambulance Local Agency 645 and may be transmitted to Ambulance First Responder AFR 640. Now in contact, FFR 605 and AFR 640 can communicate directly. At the same time, a Police First Responder PFR 615 arrives on the scene, but cannot see FFR 605 on the ground. PFR 615 has radio contact with Police Local Agency 620 which accesses the Citizens' Emergency Network by gatewaying to ham frequency and transmitting through ham node HH 636 to ham node HI 639 which is in radio contact with server S 688. Server S 688 has Internet connection 671. Server S 682 has Internet connection 683. Both having Internet connectivity, PFR 615 can communicate with FFR 605 and AFR 640 through their respective Internet connections using ham to VoIP software such as ECHOLINK.

As is customary during disasters and mass casualty incidents, shortly after an incident, an Incident Commander (IC) generally takes control of the overall response to the disaster. The Incident Commander is selected before a disaster and is commonly the local fire chief. Fire Incident Commander FIC 670 now responds to the scene and is in direct radio contact with his unit FFR 605 and his local agency FLA 610. Fire Incident Commander FIC 670 may now speak directly with the ambulance dispatch center through server node 682; FIC 670 accesses by FLA 610 to HA 612 to HB 616 to S 682 and ALA accesses by HC 618 to HD 623 to S 682.

Using the CEN 600, first responders can communicate although not accessing the same ham server. For example, should police assets be required to control a crowd of gathering spectators FIC 670 can communicate with Police First Responder PFR 615 (through their respective Internet connections 683 and 671 previously described) and police dispatch PLA 620 via the CEN 600 to alert police of the need for specific action at a given location.

After some time on the scene, the Fire Incident Commander FIC 670 becomes aware of civilian casualties and stranded civilians. FIC 670, by virtue of his position, has a telephone number for a contact at the Department of Homeland Security. FIC 670's first responder device is equipped with a Dual Tone Multiple Frequency (DTMF) keypad, and FIC 670 seeks to inform DHS 675 of the present conditions on the ground. Using the Citizens' Emergency Network, FIC 670 accesses the Internet through FLA 610 to HA 612 to HB 616, to S 682 having Internet Connection 683. Using Internet access, and using VoIP audio streaming, FIC 670 may contact DHS 675 using Remote Authentication Dial In User Service (RADIUS) 686 available through the Public Switched Telephone Network (PSTN) 689 both accessible with an Internet connection. Thus, directly from the scene, FIC 670 can dial into DHS and securely speak with officials regarding his on-the-ground observations.

DHS officials may request that the governor dispatch the National Guard to assist with evacuation efforts, but notoriously difficult to communicatively integrate into a disaster response. The mobilized National Guard commanding officer NGCO 630 is in radio contact with National Guard Local Agency 635 gatewayed to provide a ham communication as described above, and one hop to server S 688. Using the CEN 600, responding National Guard Commanding Officer 630 may speak directly to Fire Incident Commander FIC 670 regarding the perceived threat and overall vehicle staging plan, evacuation plan, and mass-casualty triage locations for the disaster. NGCO 603 is in radio contact with NGLA 635 which is gatewayed via VoIP program (e.g. ECHOLINK) to transmit the military frequency as a ham frequency. NGLA 635 is in radio contact with HG 629 and HD 619. FIC 670 is in contact with FLA 610 which is in radio contact with HA 612 and HD 619. Therefore, NGCO 630 and FIC 670 can communicate via ham frequencies using HD 619.

The Citizens' Emergency Network is dynamic and robust and may respond to changing node availability. For example assuming HD 619 loses power, turned off, or is destroyed. NGCO 630 and FIC 670 may still communicate. This is accomplished via NGLA 635's connection to server 688, and Internet Connection 671, and FIC 670's connection to the Internet via Internet Connection 683 (via FIC 670 to FLA 610 to HA 612 to HB 616 to S 682). Thus both FIC 670 and NGCO 630, utilizing the ham radio infrastructure, now have Internet access and can continue communications via VoIP Internet access to discuss specifics or disaster management. Therefore, as can be seen, the VoIP gateway can facilitate communication via local ham node access or remote Internet access, and can dynamically adjust based upon node availability.

Assume that the Department of Homeland Security DHS 675 wishes to speak with the National Guard Commanding Officer 630 on the ground, the communication may be accomplished through NGCO 630's ham-facilitated VoIP Internet connection as described above.

Continuing the example, the following day, the need for resources will likely mount. The FIC 670 can communicate with Airstrip AS 660. AS 600 can communicate with aircraft through its native radio system 661 and can be gatewayed to the CEN 600. AS 660 can communicate via ham node HB 616 which has the shortest distance between AS 660 and FIC 670. Further, it would be possible for FIC 670 to communicate directly with Aircraft AC 663 to coordinate and directly guide-in services such as a fixed-wing airdrop of resources or guide a medical evacuation via helicopter.

As can be seen, the system advantageously utilizes the existing ham radio network infrastructure. Further, as a disaster evolves, more ham radio operators will likely join the network to determine what is occurring, summon help, and provide assistance. The addition of more nodes makes the network stronger, more robust, and offers the additional communication pathways in the network. Should any node obtain grid power, it is converted from client to server mode and provides another route for Internet access strengthening the network.

Using a number of repeater nodes can result in a noticeable throughput loss, as there may be a significant reduction in bandwidth per node in a transmission link. In response, the present invention discloses a multiple communication interface enabling serial reception and transmission of messages on multiple transceivers. In one embodiment, clients and servers may implement dual wireless interfaces to increase throughput between a source node and destination node. As described thus far, the client nodes and server nodes implement a single transceiver and interface, or a single-wireless interface. One inherent disadvantage of the single wireless interface may be a significant reduction in bandwidth per node in a transmission link. Specifically, transmitting data packets from a source node through one or more repeater nodes to a destination node may effectively reduce the bandwidth by one-half per node. As a consequence, for example, as applied to the widely used 802.11b interface, no more than three repeater nodes may be able to operate between a source node and destination node without noticeable throughput loss to the destination node.

To minimize loss of throughput, in one embodiment, servers and clients may implement dual wireless interfaces. Accordingly, at least some nodes may include a first source wireless interface and a second source wireless interface, one for receiving data packets and the other for simultaneously transmitting data packets. As indicated previously, a "node" as used herein refers either to a client or server. Where these nodes implement a hardware or software control that operates according to the conventions described below, this arrangement may allow a wireless network to achieve near 100% bandwidth through each repeater node. Accordingly, at least some examples of dual-wireless interfaces described herein may significantly reduce practical limits on the number of repeater nodes and, consequently, the number of hops between a source node and a destination node.

Figure 7:
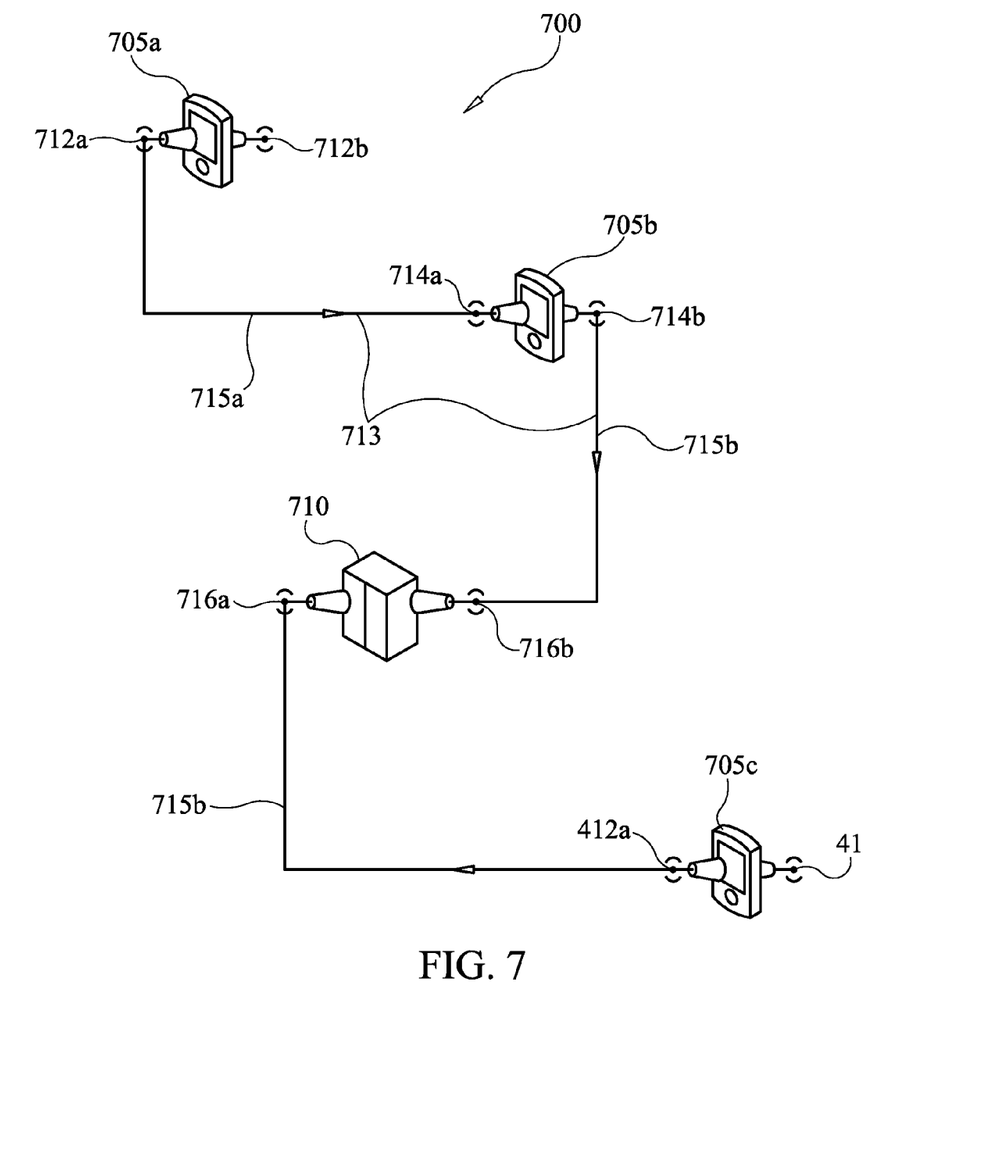
FIG. 7 is an example wireless network communication depicting communication nodes with an embodiment dual-wireless interface.

For example, FIG. 7 depicts an example wireless network including transmission paths between a series of nodes in which at least some of the nodes (e.g. each node) implement a dual wireless interface. The example system includes three clients, 705a, 705b, and 705c, and a server 710; and two transmission paths 715a and 715b. Path 715a carries data initiated at client 705a and destined for server 710, while path 715b carries data initiated at client 705c and destined for server 710. Accordingly, with respect to the illustrated paths, 715a and 715b, clients 705a and 705b act as source nodes. And in each path, server 710 acts as a destination node. In addition, the first transmission path 715a contains a repeater node, client 705b. Data packets traversing the path 715a between source client 705a and the destination server 710 have a two-hop route. And data packets traversing the path 715b between client 705c and the destination server 710 have a one-hop route.

To achieve near 100% throughput, for example, the network nodes may implement a controller configured to serve as a dispatcher in each node. The dispatcher may, in some embodiments, operate to route data packets according to the conventions described herein. One should note that any node in a wireless network system may, at times, act as a source, a repeater, and/or a destination node, depending on its function within a given transmission path. Thus, as used herein, a node acting as a source at a given time operates in "source mode," a node acting as a repeater operates in "repeater mode," and a node acting as a destination operates in "destination mode." Further, because nodes may undergo frequent mode changes as data transmission flow to and from network nodes, the control conventions described with reference to the example network of FIG. 7 should be viewed as applying to a particular "snapshot" in time.

In the case of a source node, for example, the controller may be configured, so that the dispatcher designates one of a node's wireless interfaces as the source from which it initiates all data transmission. For example, in FIG. 7, source node 705a has designated wireless interface 712a as the source wireless interface. Accordingly, all data transmissions originating from the client 705a, when acting in source mode, transmit from wireless interface 712a of client 705a. In this example, client 705a initiates a data transmission from wireless interface 712a to repeater client 705b over the first hop along transmission path 715a. Moreover, according to this convention, the dispatcher operates to ensure that all other data transmissions from client 705a initiate from the same wireless interface 712a, and the dispatcher correspondingly operates to ensure data transmissions do not initiate from the client's other wireless interface 712b.

In the case of a repeater node, the controller may be configured so that the dispatcher allows the node to receive data packets on either of its two wireless interfaces and retransmit the data on the other of its two wireless interfaces. With reference again to FIG. 7, client 705b acts as a repeater node, receiving incoming data packets from source client 705a over the first hop of transmission path 715a and retransmitting them to the destination node, server 710, on the second hop along transmission path 715b. In this case, repeater node, client 705b, received data packets on wireless interface 714a, and the dispatcher operates to retransmit the data packets on the other of client 705b's wireless interface 714b. In other words, as described above, the client 705b's dispatcher may have assigned interface 714b as the source wireless interface. That designation, however, applies only when the client 705b acts in source mode. As a result, when wireless client 705b operates in repeater mode, it repeats data transmissions on either of its wireless interfaces, which interface is determined as the wireless interface other than that on which the client received the transmission.

In the case of a destination node, the controller may be configured to allow a node to receive transmissions on either of a node's two wireless interfaces. Thus, the dispatcher may operate to allow a node acting in destination mode to receive data packets continuously on both of its wireless interfaces. For example, in FIG. 7, server 710 acts in destination mode, receiving two simultaneous and continuous data transmissions from two sources, client 705b and client 705c. On server 710's wireless interface 716a, it receives a transmission initiated at client 705c and transmitted along the one-hop path 715b. Simultaneously, server 710 receives on its wireless interface 716b a transmission from client 705b along the second hop of path 713. In this manner, the destination node may maintain near 100% throughput.

Communication nodes can be controlled as part of an overall computer system, or may be controlled by the controller part of a radio modem.

Figure 8:
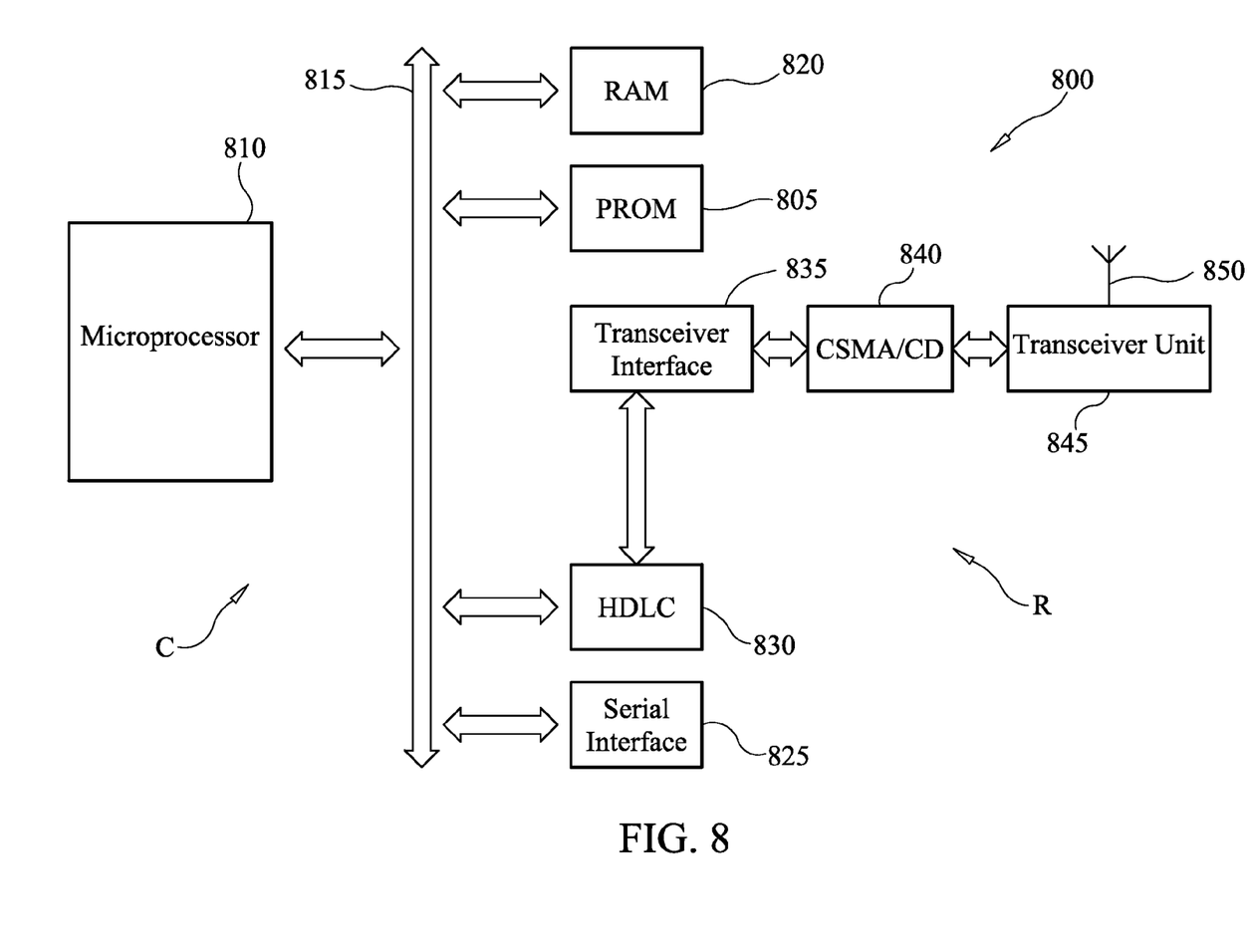
FIG. 8 is a block diagram illustrating a packet radio modem.

FIG. 8, illustrates an example radio modem which provide node client, server, and node configuration functions. A radio modem 800, such as the Gina spread spectrum radio modem, models 6000N-5 or 8000N-5 available from GRE America Inc. as a non-limiting example, is illustrated in block diagram form. Certain radio modems, such as the Gina radio modem hardware can be modified to incorporate the client process, the server process, and node configuration process by storing program steps implementing those processes into a ROM or programmable ROM (PROM) 805 of radio modem 800. Radio modem 800 includes a microprocessor 810 coupled to a bus 815. The microprocessor can be any suitable for executing functions described herein, including as a non-limiting example, an Intel 80C188 microprocessor. The PROM 805 is coupled to bus 815, as is RAM 820 serial interface 825 and an HDLC converter 830. Coupled to the HDLC converter 830 is a transceiver interface 835, and coupled to the transceiver interface 835 is a CSMA/CD unit 840. Transceiver unit 845 with antenna 850 is coupled to CSMA/CD unit 840.

Figure 9:
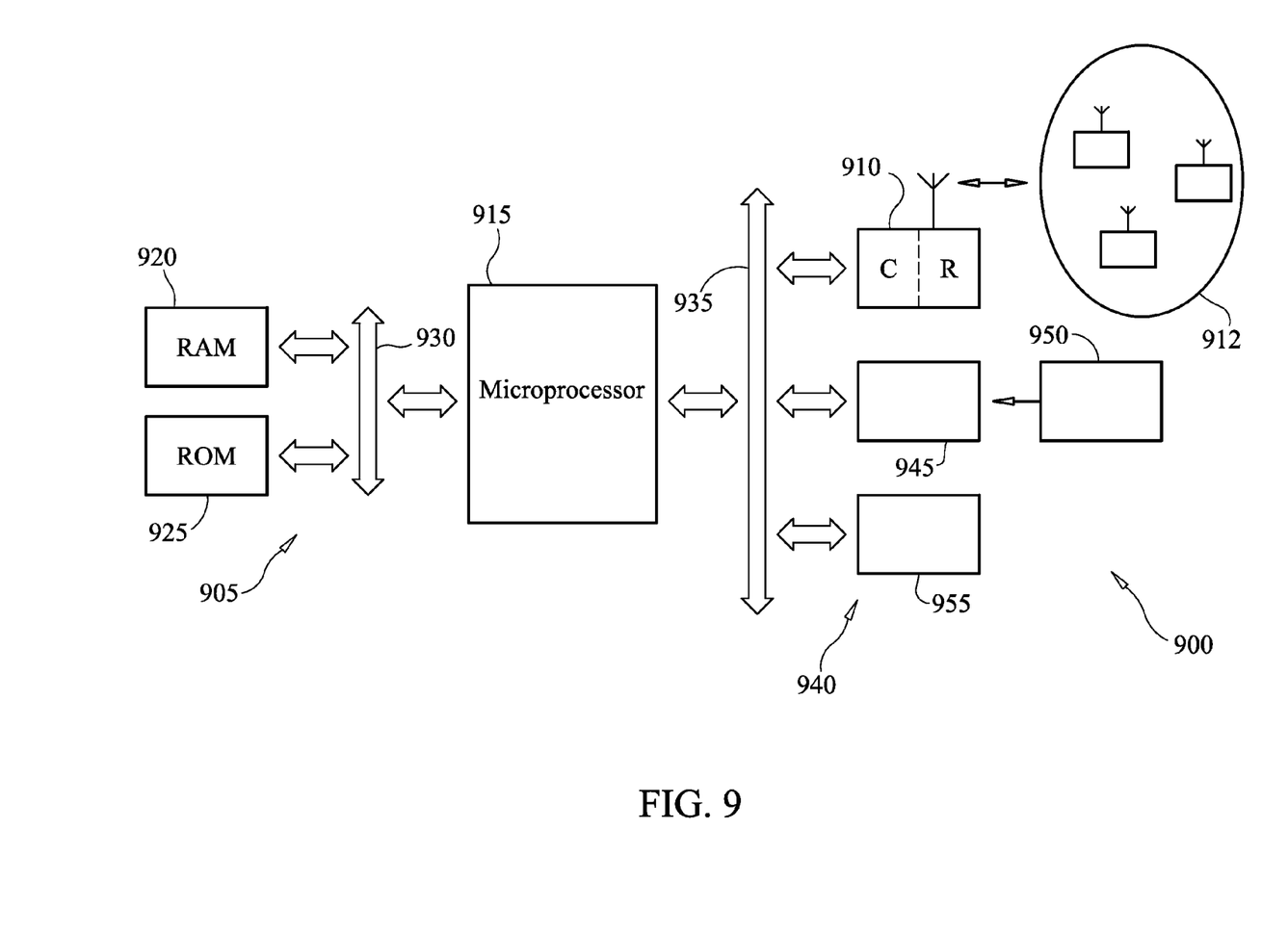
FIG. 9 is a block diagram illustrating a computer capable of providing node control.

FIG. 9, illustrates an example communication node controlled by computer. Computer controlled node 900 includes a computer 905 and radio modem 910 communicatively networked and in radio contact with one or more clients and/or server nodes 912. Computer 905 can be any digital processor including as illustrative examples only, a personal computer, work station, PDA, or smart phone. Computer 905 includes a microprocessor 915, RAM 920, and ROM 925. Microprocessor 915 is coupled to RAM 920 and ROM 925 by memory bus 930. Microprocessor 915 is also coupled to an input/output (I/O) bus 935 to which a number of peripherals 940 may be attached, including radio modem 910. Radio modem 910 includes a control portion C and radio portion R, where the control portion of the radio modem 910 is coupled to I/O bus 935. With brief reference to FIG. 8, the control portion C is everything but transceiver unit 845 and the antenna 850, and the radio portion R corresponds to the transceiver unit 845. As referenced above, client process, server process, or node determination controller processes can run on (i) computer 905, (ii) in the control C portion of modem 910, or (iii) partially on both processors. Returning to FIG. 9, Node 900 typically includes other peripherals 940 such as removable media drive 945 receptive to removable media 950, and hard disk drive 955.

Figure 10:
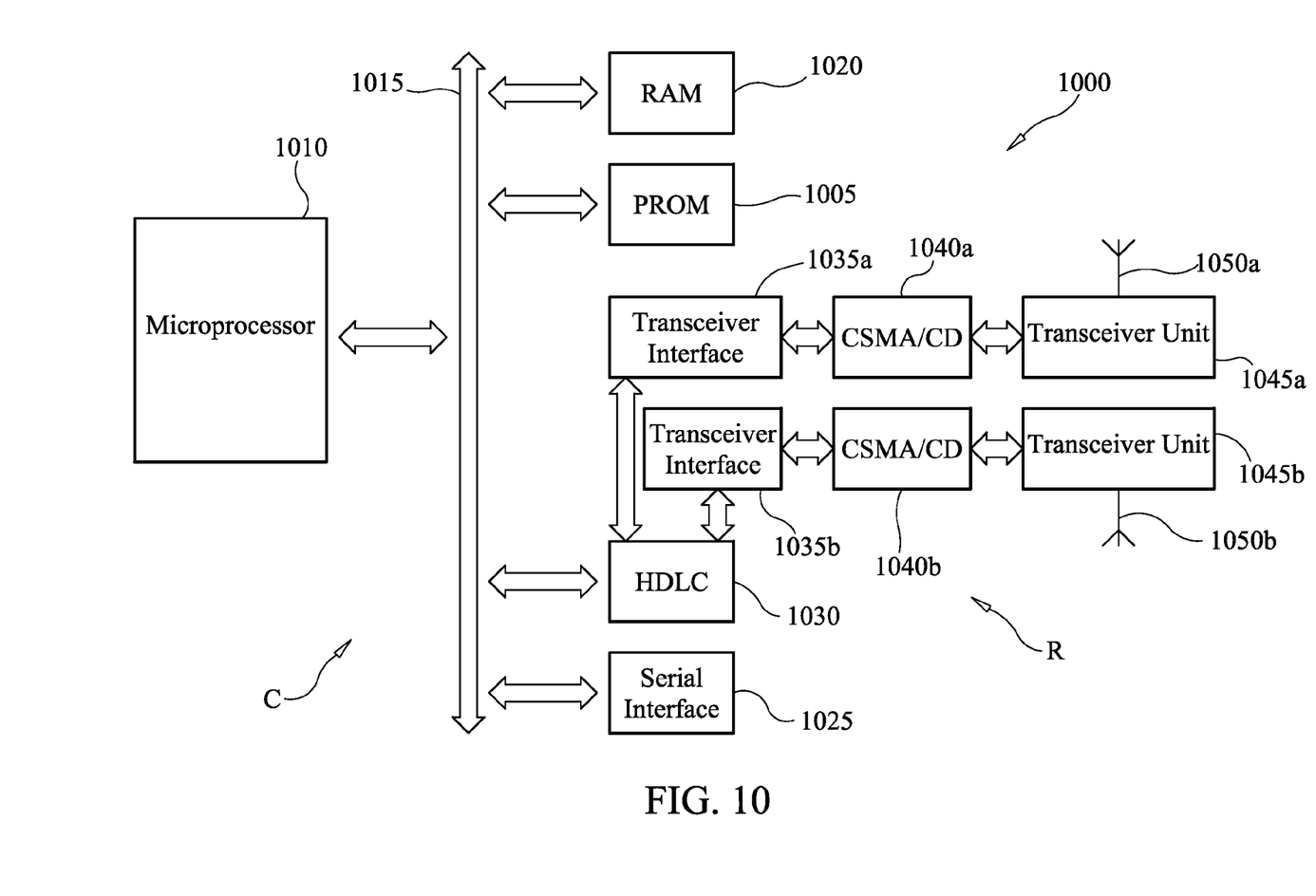
FIG. 10 is block diagram of one possible configuration of a radio modem implementing embodiment dual transceivers.

FIG. 10 illustrates a block diagram of one possible configuration of a radio modem, again showing a Control portion (C) and Radio portion (R), implementing a dual-wireless interface. Radio modem 1000, such as the Gina spread spectrum radio modem, models 6000N-5 or 8000N-5 available from GRE America Inc. as a non-limiting example, is illustrated in block diagram form. Certain radio modems, such as the Gina radio modem hardware can be modified to incorporate the client process, the server process, and node determination controller process by storing program steps implementing those processes into a ROM or programmable ROM (PROM) 1005 of radio modem 1000. Radio modem 1000 includes a microprocessor 1010 coupled to a bus 1015. The microprocessor 1010 can be any suitable for executing functions described herein, including as a non-limiting example, an Intel 80C188 microprocessor. The PROM 1005 is coupled to bus 1015, as is RAM 1020 serial interface 1025 and an HDLC converter 1030. Coupled to the HDLC converter 1030 is a first transceiver interface 1035a and second transceiver interface 1035b. Coupled to first transceiver interface 1035a is a first CSMA/CD unit 1040a, and coupled to second transceiver interface 1035b is a second CSMA/CD unit 1040b. First transceiver unit 1045a with antenna 1050a is coupled to first CSMA/CD unit 1040a; second transceiver unit 1045b with antenna 1050b is coupled to second CSMA/CD unit 1040b. In this way, radio modem 1000, illustrated in block diagram form, may incorporate a second transceiver interface 1035b, CSMA/CD 1040bb, and transceiver unit 1045b. The hardware may support the simultaneous receipt and transmission of data packets as described, by receiving incoming packets at a first transceiver unit 1045a and retransmitting outgoing packets on a second transceiver unit 1045b. Further, the radio modem hardware may incorporate the controller by storing the logic of the above-described conventions into a ROM or programmable ROM (PROM) 1005 of the radio modem R.

It should be noted that FIG. 10 may be utilized to provide a single solution for local agency communication gateways so that a single device may provide communications to a local agency through one transceiver and to a network of ham nodes through another transceiver. Further, the physical apparatus may be small and portable, potentially providing the ability to have both communication mechanisms in a single desktop or handheld transceiver.

In one embodiment a communication node may be comprised of a ham transceiver having an ECHOLINK interface. Currently, dual-band FM transceivers manufactured by Kenwood (e.g. Kenwood TM-V71 and TM-D710) provide direct ECHOLINK capabilities which permit direct cable connection directly to a PC via a PG-5H cable. Other options involve an using an interface connecting a PC and transceiver such as the W5TXR Electronic Labs EchoLink Multimode interface manufactured by W5TXR ELECTRONIC LABS. Other radio frequency gateway interface controllers for ham VoIP systems exist and can be utilized to couple a PC to a transceiver.

In one embodiment, a handheld transceiver with wireless Internet connectivity may run ham VoIP software, such as ECHOLINK, natively having wireless Internet connectivity. In those embodiments, the node would be configured as a server or client based on Internet connectivity as described by FIG. 2.

Regarding the software, the server process, the client process, and VoIP software, and the node configuration process can run on a microprocessor such as microprocessor 915, or in can be partially or wholly run on the microprocessor of a controller of a radio modem, such as the controller C or the radio modem 800 or 1000 in FIGS. 8 and 10 respectively or 910 of FIG. 9. The server controller implements a server process that includes controlling the server radio modem for the receipt and transmission of data packets from clients of the network. The client controller implements a client process including the transmission and receipt of data packets from the server and from other clients. The server process and client process are fully described in the prior art as taught by U.S. Pat. No. 6,044,062, U.S. Pat. No. 6,249,516, U.S. Pat. No. 7,054,271 and U.S. Pat. No. 8,000,314 to Brownrigg et al, each of which are hereby incorporated by reference in their entirety. As described therein, the server and client processes permit the communication nodes to monitor operational status of adjacent nodes and in response, update and optimize transmission paths.

Regarding node power, as described, communication nodes can be powered by grid power, generator power, battery power, solar cell power, rechargeable cell power, and the like. The communication nodes not operating by grid power are operatively coupled to a power source or a rechargeable power source capable of placing said nodes in the second power state.

The present invention discloses a method for establishing communication over a Citizens' Emergency Network that includes, first, providing a first responder communication device 102 capable of sending at least one message 103; a first node operating in client mode (such as AG 104) having a first transceiver adapted to communicate with the first responder device, an antenna 106 coupled to said first transceiver, a computer having a VoIP interface coupled to the first transceiver, a second ham transceiver coupled to the computer, a second antenna 108 coupled to said second ham transceiver. A second node (such as node C 118) operating in server mode having a third transceiver, an antenna 120 coupled to the third transceiver, a computer having a VoIP interface with Internet connectivity coupled to the third transceiver, wherein the VoIP interface permits at least one message sent by said first responder device to be sent by Internet to one or more recipients.

A plurality of nodes, including at least a first node and second node power up. Next, each node next determines Internet connectivity, and the nodes enter client mode or server mode with at least one node entering client mode and at least one node entering server mode. Next, a first node having a first antenna and second antenna enters client mode and receives a first radio communication through the first antenna. The first radio communication is retransmitted via program and retransmits a second communication as a ham frequency through the second antenna. A second node having a third transceiver (a ham transceiver), an antenna coupled to the transceiver, and a computer with Internet connectivity coupled to the transceiver, operates in server mode receives the second communication. Then, the second node retransmits the second communication as a third communication over the Internet connection using TCP/IP using VoIP audio streaming. The third communication is received through the Internet by at least one recipient with Internet access.

It should be clear to those skilled in the art that the transceivers described herein is but one described example embodiment, and the concepts disclosed herein may be embodied in a number of ways. As a specific non-limiting example, one preferred embodiment utilizes a communication node responding to Local Agency 104 is described herein as including two transceivers coupled to a computer. However, it is recognized that a single transceiver capable of receiving both a local agency frequency and ham frequency could be employed. Additionally, microprocessor functionality imparted by the computer, as mentioned, may be controlled by appropriate hardware located anywhere in the system. Therefore, an embodiment of LA 104 could include a single transceiver with an integrated microprocessor and memory to run the node configuration process, client mode, server mode, VoIP processes to allowing VoIP streaming to occur within such a single unit, which could use a single antenna for communications with first responder 102 and ham communications 109.

Although the present invention has been described with reference to the preferred embodiments, it should be understood that various modifications and variations can be easily made by those skilled in the art without departing from the scope and spirit of the invention. Accordingly, the foregoing disclosure should be interpreted as illustrative only and is not to be interpreted in a limiting sense. It is further intended that any other embodiments of the present invention that result from any changes in application or method of use or operation, method of manufacture, shape, size, or material which are not specified within the detailed written description or illustrations contained herein yet are considered apparent or obvious to one skilled in the art are within the scope of the present invention.

I claim:

1. A citizens' emergency network system that includes a plurality of wireless nodes operatively configured to communicate emergency messages, the system comprising:
   at least one communication device;
   at least one communication gateway configured to communicate with said communication device, the communication gateway configured to relay messages from the communication device to one or more intended recipients;
   a network of communication nodes communicatively networked with the communication gateway, wherein at least a portion of the network of communication nodes is configured to operate in a first power state when supplied by grid power and when Internet connectivity is established, and in a second power state when not supplied by grid power and when Internet connectivity is not established, wherein the network of communication nodes is configured to receive one or more messages from at least one communication gateway and to transmit one or more messages through the network to one or more intended recipients, wherein a communication node configured to the first power state will operate in server mode, and a communication node configured to the second power state will operate in client mode.

2. The system of claim 1, wherein the communication nodes monitor operational status of adjacent nodes and in response update and optimize data transmission paths.

3. The system of claim 1, wherein one or more communication nodes operating in the first power state is configured to communicate via the Internet.

4. The system of claim 1, wherein one or more communication nodes operating in the second power state is configured to communicate via wireless transmission.

5. The system of claim 1, wherein at least a portion of the communication nodes are operatively coupled to a rechargeable power source capable of placing said nodes in the second power state.

6. The system of claim 1, wherein at least a portion of the communications nodes are coupled to a solar cell capable of placing said nodes in the second power state.

7. The system of claim 1, wherein at least one of the communication nodes, when operated in the first power state, configures the one or more messages to be transmitted via the Internet to the one or more intended recipients.

8. The system of claim 1, wherein at least one of the communication nodes, when operated in the second power state, configures the one or more messages to be transmitted to the one or more intended recipients via wireless communication.

9. The system of claim 1, wherein at least one of the communication nodes is configured with a multiple communication interface enabling serial reception and transmission of data messages on multiple transceivers.

10. The system of claim 1, wherein said communication device comprises a wireless two way transceiver having a DTMF keypad.

11. The system of claim 1, further comprising a RADIUS server accessible via an Internet interface, said RADIUS server operating as a gateway between said Internet interface and the Public Switched Telephone Network.

12. The system of claim 1, wherein said messages are communicated under 802.11a protocol using orthogonal frequency-division multiplexing (OFDM).

13. An emergency network comprising:
an agency first responder communication device capable of sending at least one message;
a first node operating in client mode having a local agency transceiver adapted to communicate with the first responder device, an antenna coupled to said local agency transceiver, a computer having an agency client VoIP interface coupled to the local agency transceiver, a first ham transceiver coupled to the computer, a first ham transceiver antenna coupled to said first ham transceiver;
a second node operating in server mode having a second ham transceiver, a second ham transceiver antenna coupled to the second ham transceiver, a computer having a server VoIP interface with Internet connectivity coupled to the second ham transceiver; wherein said server VoIP interface permits at least one message sent by said agency first responder device to be sent by Internet to one or more recipients.

14. The system of claim 13, wherein at least one of the transceivers is configured with a multiple communication interface enabling serial reception and transmission of messages on multiple transceivers.

15. A method of communication during a mass casualty event, comprising:
providing;
an agency first responder communication device capable of sending at least one message;
a first node having an agency transceiver adapted to communicate with the agency first responder device, an antenna coupled to said agency transceiver, a computer having an agency client VoIP interface coupled to the agency transceiver, a first ham transceiver coupled to the computer, a first ham antenna coupled to said first ham transceiver;
a second node having a second ham transceiver, a second ham antenna coupled to the second ham transceiver, a computer having a server VoIP interface with Internet connectivity coupled to the second ham transceiver; wherein said server VoIP interface permits at least one message sent by said agency first responder device to be sent by Internet to one or more recipients;
powering up a plurality of nodes, including at least the first node and second node;
determining Internet connectivity through issuing a ping in the form of an Internet Control Message Protocol packet from the input/output method available on the processor to one or more reliable destination Internet addresses, wherein at least the first node does not have Internet connectivity and at least the second node has Internet connectivity;
second node entering server mode where Internet connectivity is established, and first node entering client mode where Internet connectivity is not established;
receiving a first radio communication from agency communication device through a first antenna of said first node;
retransmitting said first radio communication from agency communication device through said first node as a second communication, wherein said second communication is a ham frequency communication through said second antenna;
receiving the second communication through at least a second node operating in server mode having Internet connectivity;
retransmitting said second communication over the Internet using TCP/IP using server VoIP audio streaming as a third communication;
receipt of the third communication through the Internet by at least one recipient with Internet access.

* * * * *